United States Patent [19]

Steklenski

[11] E Patent Number: Re. 32,514

[45] Reissued Date of Patent: Oct. 6, 1987

[54] POLYMER COMPOSITIONS HAVING A LOW COEFFICIENT OF FRICTION

[75] Inventor: David J. Steklenski, Rochester, N.Y.

[73] Assignee: Eastman Kodak Company, Rochester, N.Y.

[21] Appl. No.: 862,346

[22] Filed: May 12, 1986

Related U.S. Patent Documents

Reissue of:

[64] Patent No.: 4,473,676
Issued: Sep. 25, 1984
Appl. No.: 503,488
Filed: Jun. 13, 1983

U.S. Applications:

[62] Division of Ser. No. 388,321, Jun. 14, 1982, Pat. No. 4,404,276.

[51] Int. Cl.[4] ..... C08L 1/28; G03C 1/78

[52] U.S. Cl. ..... 524/32; 430/531; 430/272; 430/961; 428/447; 427/387

[58] Field of Search ..... 524/31, 32, 33; 430/272, 531, 631, 961; 428/446, 447; 427/387, 393.5

[56] References Cited

U.S. PATENT DOCUMENTS

| | | | |
|---|---|---|---|
| 3,428,451 | 2/1969 | Trevoy | 430/63 |
| 3,476,659 | 11/1969 | Sato et al. | 430/52 |
| 3,632,440 | 1/1972 | Preston . | |
| 3,661,584 | 5/1972 | Van Den Heuvel et al. | 430/523 |
| 3,816,136 | 6/1974 | Goffe et al. | 430/405 |
| 3,861,914 | 1/1975 | Gange | 430/2 |
| 3,955,035 | 5/1976 | Ito et al. | 428/334 |
| 3,963,498 | 6/1976 | Trevoy | 430/63 |
| 3,969,543 | 7/1976 | Roberts et al. | 427/54 |
| 4,004,463 | 5/1977 | Trevoy | 252/500 |
| 4,004,927 | 1/1977 | Yamamoto et al. | 96/67 |
| 4,025,463 | 5/1977 | Trevoy | 252/500 |
| 4,038,082 | 7/1977 | Yoshida et al. | 430/213 |
| 4,062,681 | 12/1977 | Lewis et al. | 430/67 |
| 4,070,189 | 1/1978 | Kelley et al. | 430/527 |
| 4,164,422 | 8/1979 | Okai et al. | 430/272 |
| 4,225,663 | 9/1980 | Ball | 430/303 |
| 4,237,194 | 12/1980 | Upson et al. | 428/424.2 |
| 4,250,240 | 2/1981 | Shimada et al. | 430/66 |
| 4,303,696 | 12/1981 | Brack | 427/44 |
| 4,404,276 | 9/1983 | Steklenski | 430/531 |
| 4,473,678 | 9/1984 | Steklenski | 524/32 |

FOREIGN PATENT DOCUMENTS

| | | |
|---|---|---|
| 740041 | 8/1966 | Canada . |
| 924102 | 2/1955 | Fed. Rep. of Germany . |
| 1201995 | 8/1970 | United Kingdom . |
| 1424429 | 2/1976 | United Kingdom . |
| 1437865 | 6/1976 | United Kingdom . |
| 1483673 | 8/1977 | United Kingdom . |
| 2016167 | 9/1979 | United Kingdom . |
| 628149 | 9/1978 | U.S.S.R. . |

OTHER PUBLICATIONS

Polymer Blends, Paul et al., Ed., vol. 1, Academic Press, New York, 1978, pp. 54–63.

"Organofunctional Silicone Fluids—Silicone Polycarbinols", Dow Corning Corp., Technical Bulletin.

*Primary Examiner*—Morton Foelak
*Assistant Examiner*—Nathan M. Nutter
*Attorney, Agent, or Firm*—Paul L. Marshall

[57] ABSTRACT

Polymer compositions which have a low coefficient of friction are disclosed. The polymer compositions comprise a blend of at least 80 percent by weight of a solid of film-forming polymer and at least 0.35 percent by weight of a crosslinked silicone polycarbinol. The described composition retains its low coefficient of friction even after being exposed to hydrocarbon solvents during a cleaning process. The described compositions are particularly useful in forming protective layers for elements, particularly photographic elements.

6 Claims, No Drawings

POLYMER COMPOSITIONS HAVING A LOW COEFFICIENT OF FRICTION

Matter enclosed in heavy brackets [ ] appears in the original patent but forms no part of this reissue specification; matter printed in italics indicates the additions made by reissue.

CROSS-REFERENCE TO RELATED APPLICATIONS

The present application is a divisional of U.S. Ser. No. 388,321, filed June 14, 1982, now U.S. Pat. No. 4,404,276, which is related to U.S. Ser. No. 388,322, filed of even date herewith, issued as U.S. Pat. No. 4,431,727 entitled PROTECTIVE OVERCOATS FOR PHOTOGRAPHIC ELEMENTS by Steklenski.

FIELD OF THE INVENTION

The present invention relates to polymer compositions which have a low coefficient of friction.

DESCRIPTION RELATIVE TO THE PRIOR ART

It is well known in the art that many polymers have greater than desired coefficient of friction. The high coefficient of friction of these polymers limits their usefulness since they frequently are not useful in contact with other components, such as, machine components. It is well known to reduce the coefficient of friction of certain polymers by copolymerizing into the polymer structure a minor amount of a silicone polycarbinol. Alternatively, the coefficient of friction of certain polymers is reduced by simply blending the silicone polycarbinol with the polymer.

Both of these approaches to reducing the coefficient of friction have disadvantages. If the silicone polycarbinol is copolymerized with other monomers so as to provide a polymer with low coefficient of friction, the formulation of special polymers which are inconvenient and expensive is required. Further, not all polymers can be modified in this manner since it must be possible to copolymerize the silicone compound with the monomers which make up the polymer. If the silicone polycarbinol is blended with an already polymerized polymer, the composition does indeed have a low coefficient of friction; however, the low coefficient of friction is lost if the composition is subjected to organic solvent since the silicone polycarbinol is leached from the composition by such treatment.

Photographic elements which are used in motion pictures are cleaned using chlorinated hydrocarbon solvents. In addition, the elements are generally duplicated in what is known in the art as a "wet gate" printer. In a wet gate printer, the printing gate is constructed so that the photographic element to be duplicated is immersed in a chlorinated hydrocarbon solvent during the duplicating exposure. A useful base side protective coating for this type of element must be resistant to chlorinated hydrocarbon solvents.

One approach to providing both low coefficient of friction and abrasion resistance is described in U.K. Patent application No. 2,016,167. This reference discloses a complicated blend including a polymer, an epoxy silane for providing abrasion resistance, a silicone fluid for low coefficient of friction and a catalyst for the epoxy silane. Abrasion resistance is provided by forming an extremely tough film in situ by catalyzing the polymerization of the epoxy silane. The low coefficient of friction is provided by the silicone fluid which optionally is a silicone polycarbinol. Unfortunately, this composition also suffers from the disadvantage that the low coefficient of friction is lost when the composition is subjected to chlorinated hydrocarbon solvents, such as when subjected to cleaning or wet gate printing. No suggestion as to how to overcome this problem is made in this reference.

It is readily apparent that there is a continuing need for polymer compositions which have a low coefficient of friction. The need is particularly acute for polymer compositions which are subjected to hydrocarbon solvents, such as, chlorinated hydrocarbon solvents, during use.

SUMMARY OF THE INVENTION

I have found that the coefficient of friction of a polymer composition is significantly reduced by incorporating into the composition a crosslinked silicone polycarbinol. The coefficient of friction of such a composition is not affected by contact with chlorinated hydrocarbon solvents. Further, virtually any polymer or blend of polymers is useful in the blend of the present invention and thus the polymer compositions of the present invention are simply and economically adapted to a variety of uses.

Thus, in one aspect of the present invention, there is provided a composition comprising a blend of at least 80 percent by weight of a solid or film-forming polymer and at least 0.35 weight percent of a crosslinked silicone polycarbinol.

The composition of the present invention is particularly useful as a coating for an element. Thus, in another aspect of the present invention, there is provided an element comprising a support having thereon a layer comprising the described blend.

In yet another aspect of the present invention there is provided an element which is particularly useful as a motion picture photographic element. Thus, there is provided a photographic element comprising a support having on one side thereof a hydrophilic radiation-sensitive layer and on the other side thereof, as the outermost layer, a layer comprising a blend as described.

In a particularly preferred embodiment the cellulose nitrate-hydrophobic polymer blends of U.S. Pat. No. 4,431,727 are modified by the incorporation of the crosslinked silicone polycarbinols as described. The resulting composition provides an organic solvent resistant overcoat layer for the photographic element which has a low coefficient of friction, which is capable of chemically isolating an underlying antistatic layer and which is extremely abrasion resistant.

DETAILED DESCRIPTION OF THE INVENTION

The compositions of the present invention include a crosslinked silicone polycarbinol. The crosslinked compound is formed by reacting a silicone carbinol oligomer with a suitable multifunctional crosslinking reagent. Useful silicone carbinols include hydroxy terminated polysiloxanes selected from the group consisting of siloxanes of the general structure:

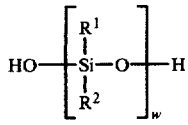

wherein each of $R^1$ and $R^2$ is independently selected from hydrogen, alkyl such as methyl, ethyl or isopropyl and aryl such as phenyl including substituted alkyl and aryl, for example tolyl, xylyl, benxyl and phenethyl; and w is an integer from about 100 to about 2500 and graft hydroxy functionalized polysiloxanes having the general structure:

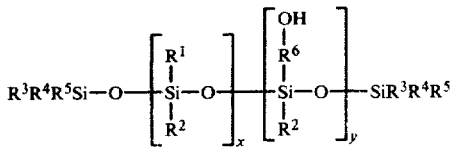

wherein $R^1$, $R^2$, $R^3$, $R^4$ and $R^5$ are each independently selected from hydrogen, alkyl and aryl as defined above and $R^6$ is a divalent linking group such as methylene, ethylene and butylene and x and y are each independentely selected from an integer from about 2 to about 15.

As noted, the crosslinked silicone polycarbinol is formed by reacting a silicone carbinol with a suitable multifunctional crosslinking reagent. Useful crosslinking reagents include any multifunctional compound which is capable of reacting with the hydroxy group of the silicone polycarbinol generally in the presence of a catalyst. Particularly useful multifunctional compounds of this type include melamines such as hexamethoxymethylmelamine and partially methylated melamine formaldehyde: glycoluril containing compounds such as Cymel 1170® and Cymel 1172® (American Cyanamide Company). Other useful multifunctional crosslinking reagents include methylol phenols such as 2-methylolphenol, 2,4,6-trimethylolphenol and methylolcresol; acyl halides such as terephthaloyl chloride, isovaleroyl chloride and sebacoyl chloride; acid anhydrides such as phthalic anhydride, maleic anhydride and pyromellitic dianhydride; and isocyanates such as toluene diisocyanates, isophorone, diisocyanate and 4,4'-methylene bis(cyclohexane isocyanate).

Crosslinking of the silicone polycarbinol occurs spontaneously as solvent is removed from a mixture which contains the solvent, polymer or polymer blend, silicon polycarbinol, multifunctional crosslinking reagent and catalyst. While not necessary, the catalyst is optionally removed from the composition after or during the removal of the solvent.

In addition to the crosslinked silicone polycarbinol, the compositions of the present invention include a solid or film-forming polymer. A wide variety of polymer or polymer blends are useful with the described crosslinked silicone polycarbinol. It is only necessary that the composition form a single phase mixture. Useful polymers include thermoplastic polymers that are soluble in common solvents including, for example, acrylic ester polymers and copolymers of acrylic esters with acrylic acids. Examples of these polymers include poly(methyl acrylate), poly(methyl methacrylate) and poly(methyl methacrylate-co-acrylic acid). Other useful polymers include polyvinyl esters such as poly(vinyl acetate); cellulose esters such as cellulose acetate, cellulose acetate/butyrate; cellulose ethers such as methyl cellulose, vinyl chloride copolymers; polyesters; and polyurethanes. Other useful polymers include cellulose nitrate, poly-styrene, and polyvinyl pyrrolidone.

The compositions of the present invention include a major amount of the solid or film-forming polymer and a minor amount of the crosslinked silicone polycarbinol. By major amount is meant that the composition includes 80 percent or more of the described polymer and, corresponding, 20 percent or less of the described crosslinked silicone polycarbinol. More particularly, the useful concentration of silicone polycarbinol in the coating composition ranges from about 0.25 to about 10 weight percent of the final composition. In preferred embodiments, the range of silicone compound is between 0.5 and 3 weight percent. The amount of crosslinking reagent varies with the amount of silicone polycarbinol. Generally, it is desirable but not necessary to include a sufficient amount of the crosslinking reagent to crosslink substantially all of the silicone compound which is included in the composition. Generally, the crosslinking reagent is in the range of about 0.1 to about 10 weight percent of the final dried composition and, preferably, in the range of about 0.5 to 5 weight percent. Thus, the weight percentage of the crosslinked silicone polycarbinol, including the crosslinking reagent, is at least 0.35 percent up to 20 percent.

The nature and amount of catalyst used in the composition of the present invention in order to catalyze the crosslinking of the silicone polycarbinol by the crosslinking reagent also varies depending on the specific silicone compound chosen and its concentration in the composition. In preferred embodiments, the reaction is catalyzed by sulfuric acid which can be present in the final composition in an amount between 0.5 and 2 weight percent. Other acids, such as phosphoric, hydrochloric and p-toluenesulfonic acid are also useful catalysts and are used in similar concentrations.

In particularly preferred embodiments the polymer compositions include a blend of cellulose nitrate and a hydrophobic polymer as described in U.S. Ser. No. 388,322, filed of even date herewith, issued as U.S. Pat. No. 4,431,727 entitled PROTECTIVE OVERCOATS FOR PHOTOGRAPHIC ELEMENTS, referenced above. These compositions provide protective overcoat layers for photographic elements which are relatively resistant to abrasion, resistant to static charging, resistant to ferrotyping, capable of chemically isolating the antistatic layer which is desirably coated on the element, are resistant to chlorinated hydrocarbon solvents, and have desirably low coefficient of friction.

The preferred polymer blend comprises a compatible blend of:

(a) cellulose nitrate and (b) a hydrophobic polymer wherein the blend has a sufficient amount of hydrophobic polymer so as to have a glass transition temperature of at least 50° C. and a sufficient amount of cellulose nitrate so as to be resistant to chlorinated hydrocarbon solvents and photographic processing compositions.

The layers containing the polymer blends of the present invention have a glass transition temperature which is at least about 50° C. Measurement of the glass transition temperature is made by methods which are well-known in the art. (See, for example, Techniques and Methods of Polymer Evaluation, Vol. 1, Marcel Dekker, Inc., New York, N.Y.).

The polymer blend contains sufficient cellulose nitrate so as to provide resistance to chlorinated hydrocarbon solvents and photographic processing compositions. By "resistance to chlorinated hydrocarbon solvents" is meant that the coated and dried layer is substantially unaffected when contacted with the described solvent. The determination of whether a particular blend is resistant to chlorinated hydrocarbon solvents is made by the following simple experiment. The blend of interest is coated on a suitable support such as a glass slide or a cellulose acetate support and allowed to dry. A sample of the element is then passed through an ultrasonically agitated bath of 1,1,1-trichloroethane at 105° F. such that is residence time in the bath is about 15 seconds. The coating is then visually examined for the effect of this treatment. If the layer remains intact during this treatment, it is considered to be resistant to chlorinated hydrocarbon solvents. Generally the same amount of cellulose nitrate also provides resistance to photographic processing compositions. That is, the layer is capable of chemically isolating underlayers from high pH solutions. It is desirable to maintain the amount of cellulose nitrate at the lowest level possible consistant with maintaining solvent and processing composition resistance because cellulose nitrate is extremely flammable. The preferred amount of cellulose nitrate in the blend is between 5 and 70 percent by weight.

The particularly preferred compositions of the present invention comprise a compatible blend of cellulose nitrate and an hydrophobic polymer. By "compatible" is meant that a layer cast from a homogeneous solution of the blend exhibits substantially no phase separation and is substantially clear. Cellulose nitrate is capable of forming a compatible blend with a wide variety of hydrophobic polymers. Whether a particular blend is compatible is determined by simple experiment. The polymer blend in question is dissolved in a solvent or solvent mixture and cast on a glass slide. A solvent mixture of acetone and 2-methoxyethanol (95/5 by volume) is useful. The acetone is a true solvent for cellulose nitrate and the 2-methoxyethanol is present to reduce the drying rate. The cast layer is allowed to dry and is visually observed. The blend is considered compatible if little or no light scattering is detected visually by viewing the layer at low angles of light incidence. This is an art-recognized method for determining polymer blend compatibility. (See R. J. Peterson et al, "Recent Advances in Polymer Compatibility", ACS Polymer Preprints, pages 385–391, 1969.)

Cellulose nitrate is the reaction product of cellulose with nitric acid. Cellulose is composed of a large number of $\beta$-anhydroglucose units. The glucose units have three hydroxyl groups and are joined together by acetyl linkages. Various grades of cellulose nitrate are characterized by the degree of substitution by nitro groups of the hydroxyl groups in the anhydroglucose units and by the degree of polymerization. Cellulose nitrates which are useful in the present invention include any of a wide variety of cellulose nitrates including those which are commercially available. Useful cellulose nitrates include RS TM cellulose nitrates, as well as AS TM and SS TM cellulose nitrates. RS TM cellulose nitrates, for example, has a nominal degree of substitution which corresponds to a nitrogen content of about 12 percent. The viscosity of a particular cellulose nitrate is related to its degree of polymerization and is expressed in terms of either centipose or the time expressed in seconds for a metal ball of specified size and density to fall through a measured distanct in a solution of the cellulose nitrate. For the purposes of the present specification, the viscosity in seconds is the time required for a 1/32-inch (0.08 cm) steel ball to fall 2 inches (5.08 cm) in a 12.2 percent solution of the cellulose nitrate in acetone at 25° C. This corresponds to the ASTMD1343-56 procedure. Reference is made to H. M. Sperlin et al, j"Cellulose and Cellulose Derivatives", High Polymers, Vol V, 2nd edition, part 3, Interscience, New York, 1955.

The other component of the compatible polymer blend of the preferred layers of the present invention is a hydrophobic polymer. By "hydrophobic" is meant substantially water-insoluble and substantially not swellable in water. In preferred embodiments, the polymer is an acrylate polymer, i.e., either a homopolymer of an acrylate monomer or a copolymer which comprises at least about 10 weight percent of an acrylate monomer. The acrylate polymer or other hydrophobic polymer has a glass transition temperature such that, when it is mixed with the desired amount of the cellulose nitrate, it provides a layer having a glass transition temperature of at least about 50° C. Acrylate monomers are esters of ethylenically unsaturated mono or dicarboxylic acids. Useful monomers include methyl methacrylate, ethyl acrylate and diethyl methylenemalonate. The comonomer of the acrylate copolymers which are useful in the blends of the present invention are any of a wide variety of monomers. Useful monomers include copolymerizable, $\alpha,\beta$-ethylenically unsaturated monomers. Useful monomers of this type include ethylene, propylene, 1-butene, isobutene, 2-methylpentene, 2-methylbutene, 1,1,4,4-tetramethylbutadiene, styrene and $\alpha$-methylstyrene; and monoethylenically unsaturated esters of aliphatic acids such as vinyl acetate, isopropenyl acetate and allyl acetate.

Useful hydrophobic acrylate polymers include poly(-methyl methacrylate), poly(butyl acrylate-co-methyl methacrylate), poly(vinyl acetate-co-methyl methacrylate), poly(ethyl methacrylate) and poly(styrene-co-methyl methacrylate). Other nonacrylate polymers which are useful in the blend include poly(vinyl acetate) and cellulose acetate butyrate.

The preferred protective overcoat layers of the present invention are coated from a solvent solution of the polymers. The solvent chosen is capable of dissolving both components of the blend as well as the silicone polycarbinol. Frequently, it is desirable to use a solvent mixture in order to adjust the viscosity of the coating composition, to economize on solvent cost or for some other purpose. Cellulose nitrate is soluble in a variety of solvents including ketones, esters, amides and nitroparaffins. Certain alcohols are also solvents for nitrocellulose, particularly when used in admixture with other solvents. Useful alcohol solvents include isopropanol and 2-methoxyethanol. If a solvent mixture is used, the cosolvent is any of a wide variety of solvents. Useful cosolvents include acetone, ethyl acetate and methyl ethyl ketone. Useful diluents include liquid hydrocarbons, either aromatic or aliphatic, such as 1,1,1-trichloroethane, dichloromethane and toluene.

The described polymer blends are coated to produce the protective layers of the present invention using any suitable method. For example, the compositions are coated by spray coating, fluidized bed coating, dip coating, doctor-blade coating or extrusion hopper coating.

The weight percent solids in the coating composition which is useful to form the layers of the present invention varies widely. The percent solids, along with the method of coating, has a substantial influence on the coverage of the layer which results from coating the composition. A useful range for the weight percent solids in the coating composition depends on the specific members of the polymer blend and the solvents chosen and is usually between about 1 percent to about 10 percent.

The protective overcoat layers of the present invention are particularly useful over antistatic layers on the base side of a silver halide photographic element. Useful antistatic layers include those described in U.S. Pat. Nos. 3,399,995, 3,674,711 and 3,011,918 which relate to layers containing water-dispersible, particulate polymers. One particularly preferred antistatic layer is described in U.S. Pat. No. 4,070,189 which relates to the use of water-dispersible, particulate vinylbenzyl quaternary ammonium or phosphonium salt polymers. Another useful antistatic layer of this type is described in U.S. Pat. No. 4,294,739. Another class of particularly preferred antistatic layers consists of the polyaniline salt-containing layers described, for example, in U.S. Pat. Nos. 3,963,498 and 4,237,194.

Photographic elements comprise a support having thereon at least one radiation-sensitive layer. The protective layer of the present invention is coated as the outermost layer on the base side of the photographic element. The other side of the photographic element, commonly referred to as the emulsion side, has as its outermost layer a hydrophilic layer. This hydrophilic layer is either the radiation-sensitive layer itself such as one containing silver halide or an overcoat layer which is hydrophilic so as to facilitate processing of the element. This outermost hydrophilic layer optionally contains a variety of addenda such as matting agents, antifoggants, plasticizers and haze-reducing agents. The outermost hydrophilic layer comprises any of a large number of water-permeable hydrophilic polymers. Typical hydrophilic polymers include gelatin, albumin, poly(vinyl alcohols) and hydrolyzed cellulose esters.

Photograhic silver halide radiation-sensitive layers are well-known in the art. Such layers are more completely described in Research Disclosure, Dec., 1978 pages 22–31, item 17643. Research Disclosure is published by Industrial Opportunities, Ltd, Homewell, Havant, Hampshire, PO9 1EF, United Kingdom.

The photographic elements of the present invention include a photographic support. Useful supports include those described in paragraph XVII of the above-identified Research Disclosure. Particularly useful supports include cellulose acetate and poly(ethylene terephthalate).

The following examples are presented to illustrate the practice of the present invention.

EXAMPLE 1

Poly(methyl methacrylate) [Elvacite® 2010, 1.5 g] and cellulose nitrate [RS-½ second grade, 1.5 g] were dissolved in 65 mL acetone and 30 mL 1,1,1-trichloroethane. To this solution was added 3.0 mL of a 2 percent (wt./vol.) solution of L-540® silicone fluid (Union Carbide Corp.) in acetone, 1.5 mL of 10 percent (wt./vol.) Cymel 303® (hexamethoxymethylmelamine; American Cyanamid) in acetone, and 0.6 mL of a 5 percent (wt./vol.) solution of $H_2SO_4$ in isopropanol. The resulting composition was coated on cellulose acetate support to give, upon removal of the solvent, a layer approximately 0.6 μm thick. The abrasion resistance of the layer was tested by a single-arm scratch test, using, for comparison, the polymer combination alone, and the polymer combination with silicone fluid but without crosslinking agent and acid catalyst. In the single arm scratch test, the film is scratched with a ballpoint stylus under increasing loads. The film is evaluated by projecting the film on a screen at a distance of 4'. The scratch resistance is subjectively rated by an experienced observer as the number of grams required to produce a visible scratch. A plow is a severe scratch including gross displacement of scratched material. Scratch data are presented below.

| | First Line | First Plow |
|---|---|---|
| (1) Polymer blend + L-540® + Cymel 303® + $H_2SO_4$ | 90 g | >140 g |
| (2) Polymer blend + L-540® (Comparison) | 90 g | >140 g |
| (3) Polymer blend only (Comparison) | 60 g | 100 g |

It is clear from these data that the scratch resistance of the polymer coating has been greatly improved by the silicone addition.

The same three films were then passed through a simulated film-cleaning device in which the films were treated with ultrasonically-agitated 1,1,1-trichloroethane at 105° F. (40° C.) for about 5 seconds. The abrasion resistance was again evaluated by the single-arm scratch test.

| | Projected at 4 feet | |
|---|---|---|
| | First Line | First Plow |
| (1) Polymer blend + L-540® + Cymel 303® + $H_2SO_4$ | 90 g | >140 g |
| (2) Polymer blend + L-540® (Comparison) | 60 g | 100 g |
| (3) Polymer blend only (Comparison) | 55 g | 100 g |

It is clear from these data that the new coating compositions maintain their enhanced abrasion resistance after treatment with the chlorinated solvent in a film-cleaning device. Films prepared with the silicone fluid alone, while providing an initial enhancement, did not maintain their improved abrasion resistance after treatment with the cleaning solvent.

EXAMPLE 2

Poly(methyl methacrylate-co-2-hydroxyethyl methacrylate) (99:1 wt.), 3.0 g, was dissolved in 95 mL of 1,2-dichloropropane. To this solution was added 3.0 mL of a 2 percent (wt./vol.) solution of DC-1248® silicone fluid (Dow Corning Corp.) in acetone, 1.5 mL of 10 percent (wt./vol.) Cymel 303® in acetone, and 0.6 mL 5 percent (wt./vol.) $H_2SO_4$ in isopropanol. The resulting composition was coated onto a cellulose acetate support to give, upon removal of the solvent, a layer approximately 0.6 μm thick. Layers with the polymer alone, and the polymer with silicone fluid but without crosslinking agent and acid catalyst, were prepared in the same manner for comparison. The three films were passed through the simulated film cleaner, as in Example 1, and the abrasion resistance was evaluated using the single-arm scratch test.

| | Before Cleaning | | After Cleaning | |
|---|---|---|---|---|
| | First Line | First Plow | First Line | First Plow |
| (1) Polymer + DC-1248 ® + Cymel 303 ® + $H_2SO_4$ | 110 g | >140 g | 80 g | >140 g |
| (2) Polymer + DC-1248 ® (Comparison) | 110 g | >140 g | 50 g | 80 g |
| (3) Polymer only (Comparison) | 50 g | 90 g | 60 g | 95 g |

Both the improvement in abrasion resistance and the maintenance of the improvement after solvent cleaning are clearly demonstrated by these data for the case in which silicone fluid crosslinking reagent and acid catalyst are added to the polymer so that the silicone polycarbinol is crosslinked.

The invention has been described in detail with particular reference to preferred embodiments thereof, but it will be understood that variations and modifications can be effected within the spirit and scope of the invention.

What is claimed is:

1. A composition comprising a blend of at least 80 percent by weight of a polymer and at least 0.35 percent by weight of a crosslinked [silicone polycarbinol] *member of the group consisting of:*

(*a*) *a hydroxy-terminated polysiloxane of the general structure:*

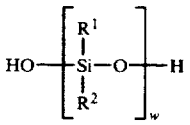

*wherein each of* $R^1$ *and* $R^2$ *is independently selected from the group consisting of hydrogen, alkyl and aryl and w is an integer from about 100 to about 2500, and*

(*b*) *a graft hydroxy functionalized polysiloxane having the general structure:*

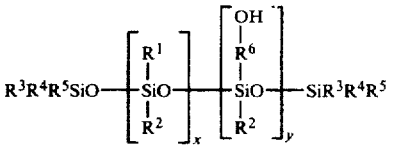

*wherein* $R^1$, $R^2$, $R^3$, $R^4$ *and* $R^5$ *are each independently selected from the group consisting of hydrogen, alkyl and aryl and* $R^6$ *is a divalent linking group and x and y are each independently selected from an integer from about 2 to about 15.*

2. The composition of claim 1 wherein said polymer is a compatible polymer blend comprising:

(a) cellulose nitrate; and (b) a hydrophobic acrylate polymer, wherein said polymer blend has a sufficient amount of the acrylate polymer so as to have a glass transition temperature of at least about 50° C. and a sufficient amount of cellulose nitrate so as to be resistant to chlorinated hydrocarbon solvents.

[3. A composition comprising a blend of a major amount of a polymer or polymer blend and a minor amount of a crosslinked member of the group consisting of a hydroxy-terminated polysiloxane of the general structure:

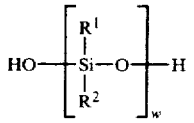

wherein each of $R^1$ and $R^2$ is independently selected from hydrogen, alkyl and aryl and w is an integer from about 100 to about 2500 and a graft hydroxy functionalized polysiloxane having the general structure:

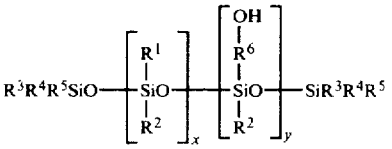

wherein $R^1$, $R^2$, $R^3$, $R^4$ and $R^5$ are each independently selected from hydrogen, alkyl and aryl and $R^6$ is a divalent linking group and x and y are each independently selected from an integer from about 2 to about 15.]

4. A composition comprising a solvent, a polymer, a silicone polycarbinol, a multifunctional crosslinking reagent and a catalyst to catalyze the crosslinking of the silicone polycarbonol by the crosslinking reagent.

5. An element comprising a support having thereon a layer comprising a blend of a major amount of a polymer or polymer blend and a minor amount of a crosslinked silicone polycarbinol.

6. The element of claim 5 wherein said polymer is a compatible polymer blend comprising:

(a) cellulose nitrate; and (b) a hydrophobic acrylate polymer, wherein said polymer blend has sufficient amount of the acrylate polymer so as to have a glass transition temperature of at least about 50° C. and a sufficient amount of cellulose nitrate so as to be resistant to chlorinated hydrocarbon solvents.

7. The element comprising a support having thereon a layer comprising a blend of a major amount of a polymer or polymer blend and a minor amount of crosslinked member of the group consisting of a hydroxy-terminated polysiloxane of the general structure:

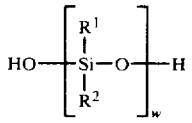

wherein each of $R^1$ and $R^2$ is independently selected from hydrogen, alkyl and aryl and w is an integer from about 100 to about 2500 and a graft hydroxy functionalized polysiloxane having the general structure:

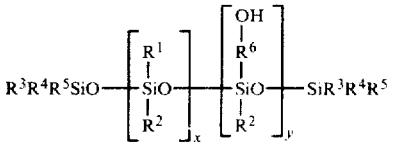

wherein $R^1$, $R^2$, $R^3$, $R^4$, and $R^5$ are each independently selected from hydrogen, alkyl and aryl and $R^6$ is a divalent linking group and x and y are each independently selected from an integer from about 2 to about 15.

* * * * *